Sept. 10, 1929.  W. E. BURROWS  1,727,745
COTTON HARVESTER
Filed Dec. 14, 1926  2 Sheets-Sheet 1
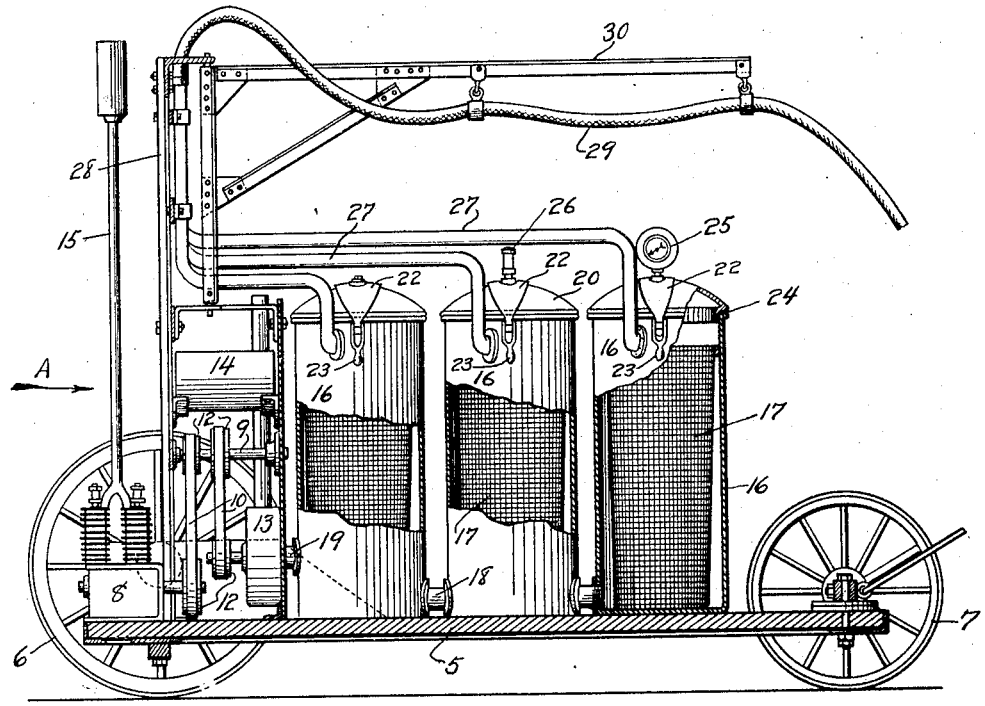
Fig. 1.
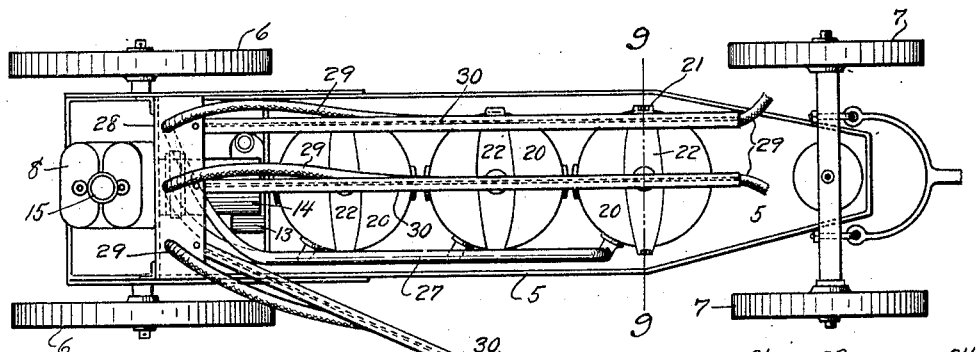
Fig. 2.
Fig. 9.
INVENTOR.
W. E. Burrows
BY
ATTORNEY.

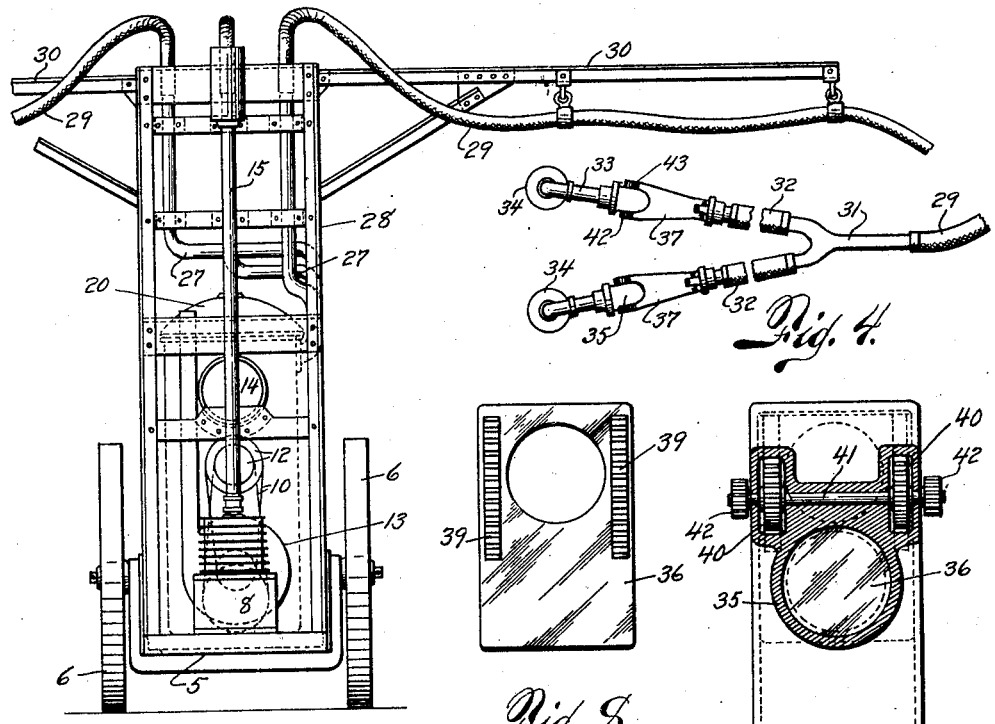

Patented Sept. 10, 1929.

1,727,745

UNITED STATES PATENT OFFICE.

WILLIAM E. BURROWS, OF CHICAGO, ILLINOIS.

COTTON HARVESTER.

Application filed December 14, 1926. Serial No. 154,770.

My invention relates to cotton harvesters and its main object is to provide a machine of simple construction which by suction applied at the plants removes the ripe cotton from the bolls.

Another object of the invention is to facilitate and expedite the removal of the cotton by the use of a mechanical appliance, thereby saving time and labor with better and more satisfactory results.

It is a further object of the invention to provide a harvesting machine of the above described character which removes and delivers the cotton without injury to either the product itself or to the operating mechanism by which the crop is collected. Another object of the invention resides in the provision of a mechanism permitting of the removal of the ripe cotton from a number of plants or from different parts of one or more plants simultaneously.

A further object is to provide a cotton harvesting machine which collects the cotton which is removed from the plants by a number of operators, in separate receptacles, and still other objects may be found in details of construction and a novel arrangement of parts as will be fully brought out in the course of the following description.

In the accompanying drawings, in the several views of which like parts are similarly designated Figure 1 represents a partially sectional elevation of a harvesting machine constructed in accordance with my invention, Figure 2, a plan-view of the same, Figure 3, an end-elevation of the machine looking in the direction of the arrow A in Figure 1, Figure 4, an enlarged view of the suction-nozzles by which the crops are collected at the plants, Figure 5, an enlarged fragmentary elevation of one of the nozzles, Figure 6, an underneath view of the same, looking in the direction of the arrow B in Figure 5, Figure 7, a further enlarged section taken on the line 7—7 Figure 5, Figure 8, an enlarged section along the line 8—8 Figure 5, and Figure 9, an enlarged section through the upper portion of one of the tanks comprised in the construction, taken on the line 9—9 in Figure 2.

The machine as shown comprises a carriage 5 supported on wheels 6 and 7 and adapted to be drawn between rows of cotton plants in a field to be harvested, by one or more draft animals or by a tractor.

Mounted at the rear end of the carriage is an engine 8 preferably of the internal combustion type, which by means of a jack shaft 9, and suitable transmission devices such as the belts 10 and pulleys 12, is operatively connected with a suction fan 13.

The fuel for the operation of the engine may be stored in an elevated tank 14 and the gases of combustion discharged from the engine escape into the atmosphere at a point high above the carriage through a conduit 15. The carriage further supports a battery of upright tanks 16 in which, in the operation of the machine, the cotton is collected. Each tank contains a foraminous basket 17 preferably made of woven wire and supported on the bottom thereof and the several tanks are connected at their lower portions with the suction opening of the fan either individually or, as illustrated in the drawings, by interconnection through the medium of couplings 18 and by the connection of the tank nearest to the engine, with the suction fan by means of a nipple 19.

The tanks are equipped with removable lids 20 preferably hinged as at 21 and held in place by spring-straps 22 which extend across the lids and are fastened in place by means of cam-levers 23 engaging with catches at the sides of the body-members of the tanks. The cams are designed to draw the lids downwardly upon the rims of the tanks by means of the resilient straps, and gaskets 24 of rubber or other suitable packing-material, placed between the two parts aid in the production of air-tight joints.

The tanks may be provided with one or more pressure gages as indicated at 25 and with safety-valves or exhaust cocks 26 which after proper adjustment, maintain the partial vacuum produced in the tanks, at a predetermined minimum.

The specific construction of the above described appurtenances, including the clamping means for the lids, forms no part of the present invention, and they have been shown in outline only with the understanding that with respect to details of construction of these and other devices used in connection with the more essential elements of the machine, variations in form and arrangement may be resorted to without departing from the scope of the invention as defined in the hereunto appended claims.

The baskets in the tanks are open at their tops and the tanks have above the baskets, inlet openings through which the cotton enters in the operation of the machine. The inlets are connected with conduits 27 fastened on an upright frame 28 at the rear of the carriage and the open ends of the conduits are by means of air-tight swivel joints connected with flexible hose 29 of sufficient length to reach the cotton plants in the rows along which the machine is drawn.

Two of the hose are suspended from cranes 30 pivotally mounted on the frame 28, and a third hose intermediate of the others, may be fastened above the carriage to extend to one side of the machine. At the end of each hose is a union 31 for the connection of two branch-tubes 32 likewise made of flexible material, and at the ends of the branch tubes are nozzles 33.

The nozzles may be connected with the ends of the respective hose by swiveled or flexible joints of any suitable air-tight construction, permitting of ready movement of the nozzles to different parts of the cotton plants, and the nozzles are provided with bell shaped mouth-pieces 34 to facilitate the entrance of the cotton as it is removed from the plants.

Each nozzle has a valve housing 35 provided with a slide way for a gate valve 36 the position of which is controlled by a lever 37 which is fulcrumed on the nozzle as at 38. The gate-valve has racks 39 at opposite sides thereof as best shown in Figure 8, which racks are engaged by toothed wheels 40 at opposite ends of a shaft 41 rotatably supported in a bearing on the housing, and the shaft carries outside the housing, pinions 42 of smaller diameter which mesh with toothed segments 43 at the free end of the lever.

The operator holding the nozzles, can open their respective gates by pressure of the hands upon the levers and again close the same when the pressure is released so that in the operation of the machine, the suction produced by partial vacuum in the tanks on the carriage is made effective only at the time the mouths of the nozzles are placed opposite to the bolls from which the cotton is to be removed.

It will thus be apparent that the removal of the ripe cotton is under complete control of the operator who owing to the flexibility of the connections of the nozzle with the conduits 27 connected to the vacuum tanks can remove the cotton from different parts of the plants with little effort and in the minimum of time. The constantly operating suction fan maintains a partial vacuum in the battery of tanks while the machine is drawn along the rows of cotton plants and each time one of the operators places the nozzles in the vicinity of the cotton-boll and opens the respective valves, the ripe cotton is immediately removed by suction and drawn through the inlet of the tank into the respective foraminous basket.

The mesh of the basket is such that the cotton can not pass to the opening in the lower portion of the tank at which it connects with the suction fan and the cotton is thus collected in the basket until it is filled when by removal of the lid of the tank, it is removed, emptied and replaced with little trouble or loss of time.

The machine is usually drawn between two rows of cotton plants and the hose and cranes are adjusted so that two of the nozzle-elements are at one side of the machine and another element at the other side of the same. Three operators each carry one of the nozzle elements holding the two members thereof in both hands, and three rows of cotton plants are thus harvested simultaneously while the carriage is moved along the same.

The pivotal connections of the cranes and the flexibility of the hose and the nozzle connections permit of moving the nozzles in different directions toward the rear or front of the machine and at opposite sides of the same, and after the baskets of the several tanks are filled and the operation of the machine is temporarily discontinued, the contents of the baskets removed from the tanks, can be weighed and the various amounts of harvested cotton accredited to the different operators.

At the beginning of the operation the row along which the carriage is drawn is left unharvested but upon the return movement of the carriage after it has reached an end of the field, it follows one of the harvested rows so that by movement of the carriage alternately in opposite directions, the entire field is covered.

It is an important feature of the invention that in the operation of the machine, no cotton passes through the fan or other part of the operating mechanism so that the cotton is harvested free from injury and without danger of interfering with the operation of the apparatus.

The carriage is hung low so that it is not easily upset, and, being mounted on four wheels having broad tires, it is easily drawn over the field. The frame at the rear of the carriage, and the cranes are of sufficient height to support the hose above the tallest cotton plants in the field.

Having thus described my invention, what I claim and desire to secure by Letters Patent is:—

1. A harvesting machine comprising a plurality of tanks inter-connected at their bottom portions for the passage of air from one to another, a suction device for drawing air from one of the tanks, each tank having an air inlet at the top portion thereof, foraminous baskets in the tanks between the inlets and the inter-connections, conduits connecting with the inlets, and nozzles on the conduits.

2. A cotton harvester comprising a series of tanks interconnected for the passage of air consecutively through the tanks of the series, a suction device connected with one of the tanks, whereby to draw air from all of the connected tanks, means to retain cotton carried by the air in each tank, and intake conduits connected with the tanks for the supply of cotton-carrying air thereto 3. A harvesting machine comprising a plurality of tanks interconnected at one end for the passage of air from one to another, and having air inlets at their other ends, a suction device drawing air from one of the tanks, foraminous baskets in the tanks between the inlets and the interconnections, conduits connected with the inlets, and nozzles on the conduits.

In testimony whereof I have affixed my signature.

WILLIAM E. BURROWS.